US012000117B2

(12) United States Patent
Yamada et al.

(10) Patent No.: US 12,000,117 B2
(45) Date of Patent: Jun. 4, 2024

(54) CONSTRUCTION ASSISTING SYSTEM AND WORK MACHINE

(71) Applicant: Hitachi Construction Machinery Co., Ltd., Tokyo (JP)

(72) Inventors: Hiroyuki Yamada, Tokyo (JP); Shinya Imura, Tsuchiura (JP); Shiho Izumi, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 17/767,986

(22) PCT Filed: Oct. 13, 2020

(86) PCT No.: PCT/JP2020/038639
§ 371 (c)(1),
(2) Date: Apr. 11, 2022

(87) PCT Pub. No.: WO2021/075428
PCT Pub. Date: Apr. 22, 2021

(65) Prior Publication Data
US 2024/0084556 A1 Mar. 14, 2024

(30) Foreign Application Priority Data
Oct. 15, 2019 (JP) ................................ 2019-188521

(51) Int. Cl.
*E02F 9/26* (2006.01)
*E02F 9/20* (2006.01)
(Continued)

(52) U.S. Cl.
CPC ............ *E02F 9/262* (2013.01); *E02F 9/2033* (2013.01); *E02F 9/24* (2013.01); *G08B 21/22* (2013.01)

(58) Field of Classification Search
None
See application file for complete search history.

(56) References Cited

U.S. PATENT DOCUMENTS

2018/0209122 A1* 7/2018 Kiyota ..................... H04N 7/18
2019/0360172 A1* 11/2019 Yamamoto ............. E02F 9/226
(Continued)

FOREIGN PATENT DOCUMENTS

JP 2003-105807 A 4/2003
JP 4945670 B2 6/2012
(Continued)

OTHER PUBLICATIONS

International Preliminary Report on Patentability (PCT/IB/338 & PCT/IB/373) issued in PCT Application No. PCT/JP2020/038639 dated Apr. 28, 2022, Including English translation of document C2 (Japanese-language Written Opinion (PCT/ISA/237), filed on Apr. 11, 2022) (six (6) pages).
(Continued)

*Primary Examiner* — Amelia Vorce
(74) *Attorney, Agent, or Firm* — Crowell & Moring LLP

(57) ABSTRACT

A construction assisting system including a controller that performs construction assistance processing on the basis of positional relation between a worker and a hydraulic excavator, the construction assisting system including: an approach intention detecting device that detects an intention of the worker to approach the hydraulic excavator; an approach intention presenting device that presents a detection result of the approach intention detecting device to an
(Continued)

operator of the hydraulic excavator; and an approach confirmation obtaining device that obtains a confirmation state of the operator of the hydraulic excavator for contents presented by the approach intention presenting device, the controller performing the construction assistance processing on the basis of position information of the worker when the operator of the hydraulic excavator denies the approach of the worker or when the operator of the hydraulic excavator does not confirm the intention of the worker to approach. It is thereby possible to perform construction assistance according to the intention of the worker, and further improve safety of the worker while suppressing a decrease in work efficiency.

9 Claims, 12 Drawing Sheets

(51) Int. Cl.
*E02F 9/24* (2006.01)
*G08B 21/22* (2006.01)

(56) References Cited

U.S. PATENT DOCUMENTS

| | | | | |
|---|---|---|---|---|
| 2019/0360177 | A1* | 11/2019 | Kiyota | G08G 1/166 |
| 2021/0002859 | A1* | 1/2021 | Wu | E02F 9/2242 |
| 2021/0002863 | A1* | 1/2021 | Sakuta | E02F 9/123 |
| 2022/0145593 | A1* | 5/2022 | Yokota | E02F 9/2033 |

FOREIGN PATENT DOCUMENTS

| | | | | | |
|---|---|---|---|---|---|
| JP | 2015-209718 | A | | 11/2015 | |
| JP | 6212197 | B1 | | 10/2017 | |
| KR | 20190034282 | A | * | 4/2019 | E02F 9/26 |
| WO | WO-2018151280 | A1 | * | 8/2018 | B60R 1/00 |

OTHER PUBLICATIONS

International Search Report (PCT/ISA/210) issued in PCT Application No. PCT/JP2020/038639 dated Dec. 15, 2020 with English translation (four (4) pages).
Japanese-language Written Opinion (PCT/ISA/237) issued in PCT Application No. PCT/JP2020/038639 dated Dec. 15, 2020 (four (4) pages).

* cited by examiner

AT TIME OF DETECTION OF APPROACH INTENTION

AT TIME OF PRESENTING APPROACH CONFIRMATION
(CASE OF APPROACH RECOGNIZING STATE)

AT TIME OF PRESENTING APPROACH CONFIRMATION
(CASE OF APPROACH PROHIBITING STATE)

AT TIME OF PERFORMING SAFETY OPERATION

CONSTRUCTION ASSISTING SYSTEM AND WORK MACHINE

TECHNICAL FIELD

The present invention relates to a construction assisting system and a work machine.

BACKGROUND ART

A worker who performs work on the periphery of a work machine such as a construction machine or a mobile crane reduces a risk of being jammed or caught by the work machine, for example, by performing work while considering positional relation to the work machine or keeping a distance from the work machine as required. On the other hand, the worker may need to approach the work machine for a purpose of assisting in work with the work machine or the like.

As a technology related to a risk reduction for such a worker, Patent Document 1, for example, discloses a method of stop control in an intrusion prohibiting region of a work vehicle, the stop control method setting the intrusion prohibiting region on the periphery of the work vehicle in advance, sensing the position of an intruding object such as a worker intruding into a work region, and stopping the work vehicle when the intruding object enters the inside of the set intrusion prohibiting region, and the stop control method allowing the intrusion prohibiting region to be changed according to work contents of the intruding object such as the worker.

PRIOR ART DOCUMENT

Patent Document

Patent Document 1: JP-2003-105807-A

SUMMARY OF THE INVENTION

Problem to be Solved by the Invention

In the above-described conventional technology, the intrusion prohibiting region to be applied can be changed according to the work contents determined in advance for the worker. When a worker having work contents that do not require approaching the work machine approaches the work machine, the work machine is stopped according to the intrusion prohibiting region set sufficiently large. The risk of the worker is thereby decreased. In addition, when a worker approaching the work machine for a purpose of assisting the work machine or the like approaches the work machine, a decrease in work efficiency due to frequent stopping of the work machine is suppressed by an intrusion prohibiting region set to a necessary minimum.

However, it is fairly conceivable that, for example, a worker for which a minimum necessary intrusion prohibiting region is set for a purpose of assisting the work machine performs work for which a relatively large intrusion prohibiting region is set. In this case, an inconsistency occurs between the work contents and the intrusion prohibiting region. That is, where the worker does not notice the work machine approaching during work, a situation is conceivable in which the work machine stop control does not work even when the worker approaches the work machine in an unintended state.

The present invention has been made in view of the above. It is an object of the present invention to provide a construction assisting system and a work machine that can perform construction assistance according to an intention of a worker, and can further improve safety of the worker while suppressing a decrease in work efficiency.

Means for Solving the Problem

The present application includes a plurality of means for solving the above-described problems. To cite an example of the means, there is provided a construction assisting system including a controller that performs construction assistance processing of assisting in construction performed by a work machine on the basis of positional relation between a worker and the work machine, the construction assisting system including: a worker position information obtaining device that obtains position information of the worker; an approach intention detecting device that detects an intention of the worker to approach the work machine; an approach intention presenting device that presents a detection result of the approach intention detecting device to an operator of the work machine; and an approach confirmation obtaining device that obtains a confirmation state of the operator of the work machine for contents presented by the approach intention presenting device, the controller performing the construction assistance processing on the basis of the position information obtained by the worker position obtaining device when the confirmation state obtained by the approach confirmation obtaining device is a state in which the operator of the work machine denies an approach of the worker or when the operator of the work machine does not confirm the intention of the worker to approach.

Advantages of the Invention

According to the present invention, it is possible to perform construction assistance according to an intention of a worker, and further improve safety of the worker while suppressing a decrease in work efficiency.

MODES FOR CARRYING OUT THE INVENTION

Embodiments of the present invention will hereinafter be described with reference to the drawings.

Incidentally, while the present embodiment will be described by illustrating a hydraulic excavator including a front implement (work implement) as an example of a work machine, the present invention can be applied also to any other work machines such as a wheel loader and a bulldozer.

First Embodiment

A first embodiment of the present invention will be described with reference to FIGS. 1 to 10.

Figure 1:
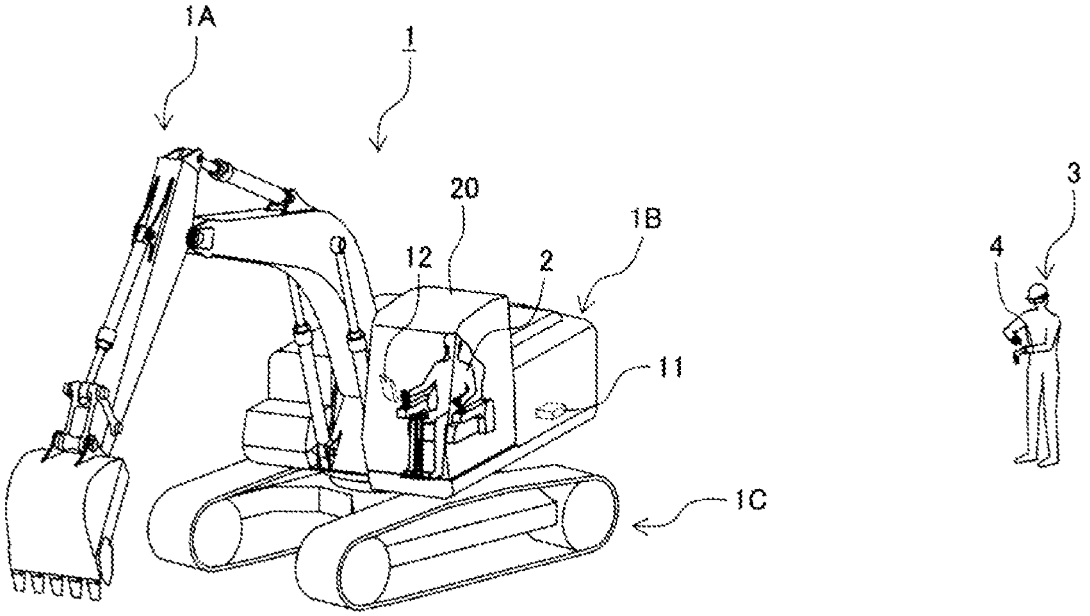
FIG. 1 is a diagram schematically showing a state of a work site to which a construction assisting system is applied.

FIG. 1 is a diagram schematically showing a state of a work site to which a construction assisting system according to the present embodiment is applied.

FIG. 1 illustratively shows a case where a hydraulic excavator 1 as an example of a work machine and a worker 3 perform work on the work site.

In FIG. 1, the hydraulic excavator 1 includes: a lower track structure 1C; an upper swing structure 1B swingably provided with respect to the lower track structure 1C; and an articulated work device 1A provided to the upper swing structure 1B and including a work tool such as a bucket. A controller 11 that controls operation of the whole of the hydraulic excavator 1 is disposed in the upper swing structure 1B.

In addition, the upper swing structure 1B is provided with a cab 20 boarded by an operator 2 who operates the hydraulic excavator 1. Disposed within the cab 20 is an input-output device 12 that can output various kinds of information to the operator 2 or to which the operator 2 can input various kinds of settings and information. The input-output device 12 may, for example, be constituted by a touch panel monitor, or may be an input-output device including an input device and an output device separated from each other. Incidentally, the controller 11 and the input-output device 12 are connected to a communicating function (communicating device 55) such as a wireless LAN, and are thereby able to communicate to the inside and outside of the hydraulic excavator 1.

The worker 3 is a worker who may perform work on the periphery of the hydraulic excavator 1. The worker 3 carries and wears a worker terminal 4. The worker terminal 4 is, for example, a wristwatch wearable device. The worker terminal 4 has a touch panel monitor, a satellite positioning function of GPS or the like, a communicating function (communicating device 54) of a wireless LAN or the like, a vibrating function of conveying information to the wearer by vibration, and the like. Incidentally, the worker terminal 4 may not be a wristwatch wearable device. The worker terminal 4 may be in another form such as a smart phone as long as the worker 3 can carry the worker terminal 4 and the worker terminal 4 has similar functions.

Figure 2:
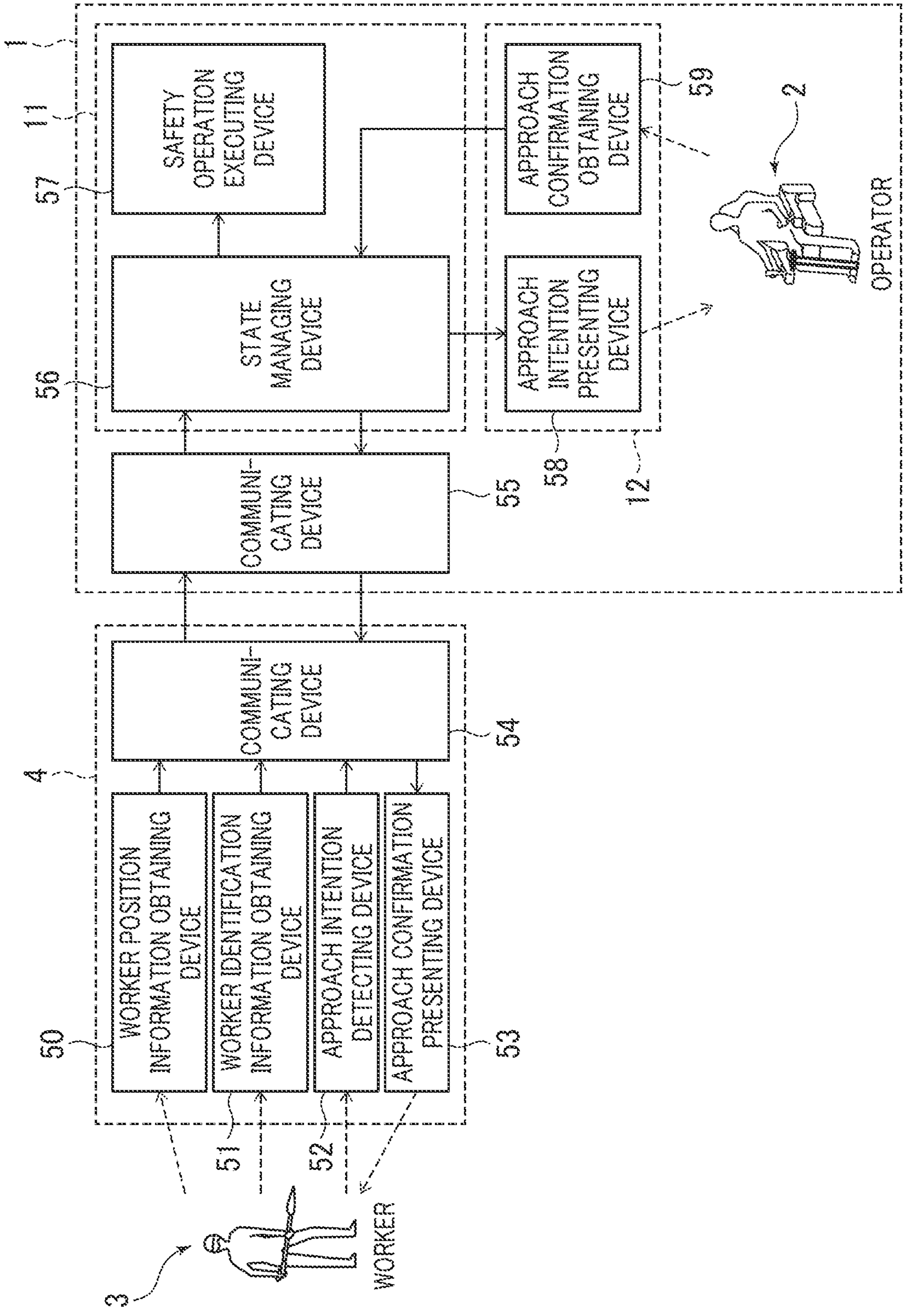
FIG. 2 is a functional block diagram schematically showing a general configuration of the construction assisting system according to a first embodiment.

FIG. 2 is a functional block diagram schematically showing a general configuration of the construction assisting system according to the present embodiment.

In FIG. 2, the construction assisting system includes: a worker position information obtaining device 50, a worker identification information obtaining device 51, an approach intention detecting device 52, an approach confirmation presenting device 53, and a communicating device 54 that are provided to the worker terminal 4 of the worker 3; and a communicating device 55, a state managing device 56, a safety operation executing device 57, an approach intention presenting device 58, and an approach confirmation obtaining device 59 that are provided to the hydraulic excavator 1. The state managing device 56 and the safety operation executing device 57 are implemented by the controller 11 mounted in the hydraulic excavator 1. The approach intention presenting device 58 and the approach confirmation obtaining device 59 are implemented by the input-output device 12.

The worker position information obtaining device 50 is implemented by a satellite positioning system such as GPS within the worker terminal 4. By measuring the position of the worker terminal 4, the worker position information obtaining device 50 substitutes the position of the worker terminal 4 for the position of the worker 3.

The worker identification information obtaining device 51 is implemented by input, by the worker 3, of identification information of the worker 3 himself/herself to the worker terminal 4. The identification information may, for example, be a number assigned in advance, or may be biological information such as a fingerprint.

The approach intention detecting device 52 is implemented by a method of, for example, pressing of a button on the worker terminal 4 by the worker 3.

The approach confirmation presenting device 53 is implemented by the worker terminal 4 by presenting confirmation information of the operator 2 to the worker 3 by vibration, sound, display, or the like.

The communicating devices 54 and 55 are, for example, implemented by wireless communication of a wireless LAN. Information obtained by each of the worker position information obtaining device 50, the worker identification information obtaining device 51, and the approach intention detecting device 52 and information to be transmitted to the approach confirmation presenting device 53 are exchanged with the state managing device 56 via the communicating device 54 provided to the worker terminal 4 and the communicating device 55 provided to the hydraulic excavator 1.

The state managing device 56 associates worker position information and approach intention information obtained from the same worker terminal 4 with each other by using worker identification information, and stores resulting information as a worker state. As the worker state, approach confirmation information as an approach confirmation result of the operator 2 is also stored in association with the worker identification information in addition to the worker position information, the worker identification information, and the worker approach intention information. The state managing device 56 sends the worker identification information and the worker approach intention information to the approach intention presenting device 58.

The approach intention presenting device 58 conveys an approach intention of the worker 3 to the operator 2 by sound, display, or the like. The operator 2 performs input as to whether to recognize the approach intention of the worker 3 or deny the approach to the approach confirmation obtaining device 59 on the basis of the information presented by the approach intention presenting device 58. The approach confirmation obtaining device 59, for example, has two buttons of “recognize” and “deny,” and is implemented by allowing the operator 2 to press either button. At this time, when the operator 2 presses the "recognize" button, a confirmation state is set to be an "approach recognizing state," and when the operator 2 presses the "deny" button, the confirmation state is set to be an "approach prohibiting state." The approach intention presenting device 58 and the approach confirmation obtaining device 59 are constituted by the input-output device 12 that, as with a touch panel monitor, allows input and output to be performed on the one apparatus. However, the approach intention presenting device 58 and the approach confirmation obtaining device 59 do not necessarily need to be one apparatus, but may be separate apparatuses.

After the approach confirmation obtaining device 59 obtains the confirmation information of the operator 2, the approach confirmation obtaining device 59 sends this information to the state managing device 56. The state managing device 56 stores the confirmation information in association with the worker position information and the worker approach intention information on the basis of the worker identification information, as described above.

The safety operation executing device 57 performs, for example, processing related to safety operation as construction assistance processing. In the construction assistance processing, the worker position information and the confirmation information are read from the state managing device 56, approaching work toward the hydraulic excavator 1 is prohibited when the confirmation information does not represent the approach recognizing state, and processing of decelerating or stopping operation of the hydraulic excavator 1 or the like is performed as safety operation when a worker position is within a movable region A1 (to be described later) as one of work regions set on the periphery of the hydraulic excavator 1. In addition, when the confirmation information represents the approach recognizing state, the approaching work toward the hydraulic excavator 1 is allowed, and the safety operation is not performed even where the worker position is within the movable region A1. Incidentally, in addition to decelerating or stopping the operation of the hydraulic excavator 1, the safety operation may urge the worker 3 to go out of the movable region A1 by a warning using sound, a warning using the lighting of a warning light, or the like.

Figure 3:
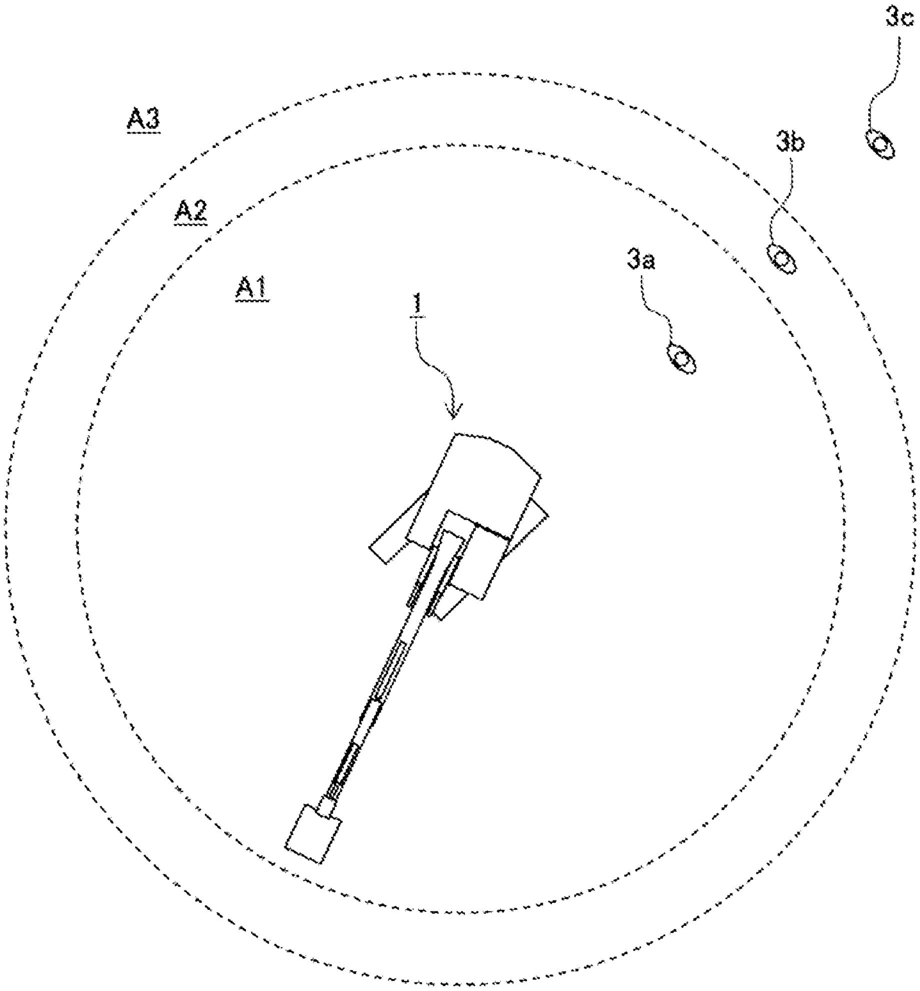
FIG. 3 is a diagram showing an example of settings of work regions set on the periphery of a hydraulic excavator.

FIG. 3 is a diagram showing an example of settings of the work regions set on the periphery of the hydraulic excavator. FIG. 3 shows positional relation between the hydraulic excavator 1, the worker 3 (workers 3*a* to 3*c*), and the work regions. As shown in FIG. 3, a movable region A1, a notification region A2, and a notification outside region A3 are set as the work regions on the periphery of the hydraulic excavator 1.

The movable region A1 is a range reachable by the structure of the hydraulic excavator 1. When a worker (for example, a worker 3*a*) is present within the movable region A1, for example, there occurs a risk of the worker 3*a* colliding with or being jammed or caught by the hydraulic excavator 1, for example. Accordingly, in the present embodiment, a reduction in the risk is achieved by communication between the operator 2 of the hydraulic excavator 1 and the worker 3 when the worker 3 performs work (approaching work) within the movable region A1.

The notification region A2 is set outside the movable region A1 as viewed from the hydraulic excavator 1. When a worker (for example, a worker 3*b*) is present within the notification region A2, for example, there is no risk of the worker coming into contact with the hydraulic excavator 1 because the worker is outside the movable region A1, but the worker can easily intrude into the movable region A1. That is, the notification region A2 is a region in which there is a possibility of intruding into the movable region A1.

The notification outside region A3 is a region further outside the notification region A2 as viewed from the hydraulic excavator 1. There is no possibility of a worker (for example, a worker 3*c*) present on the notification outside region A3 intruding into the movable region A1 immediately (that is, without passing the notification region A2), and there is no imminent risk of the worker coming into contact with the hydraulic excavator 1.

Here, an outline of the construction assisting system according to the present embodiment will be described. In the present embodiment, it is a first object to assist in forming a state in which communication is established between the operator 2 of the work machine (hydraulic excavator 1) and the worker 3 on the periphery of the work machine (hydraulic excavator 1). In addition, it is a second object for the work machine and the worker terminal to perform safety operation as required so that work is not performed on the periphery of the work machine when the communication is not established. Then, the construction assisting system according to the present embodiment prompts the operator 2 and the worker 3 for the following behavior in order to achieve the first and second objects.

First, when the worker 3 is present outside the notification region A2 (for example, at the position of the worker 3*c*), the construction assisting system does not perform operation related to the present invention.

When the worker 3 intrudes into the notification region A2 (for example, at the position of the worker 3*b*), the worker terminal 4 notifies the worker 3 that the worker 3 has entered the notification region A2 by means of sound, vibration, or the like, and the worker terminal 4 is set in a state of making display for confirming an intention to approach the hydraulic excavator 1 and waiting for input. The worker 3 checks the worker terminal 4. When the worker 3 intends to approach the hydraulic excavator 1, the worker 3 inputs the intention of approaching by operating the worker terminal 4. When the worker 3 does not intends to approach, the worker 3 goes out of the notification region A2.

When the intention of the worker 3 to approach is input, the worker terminal 4 transmits the information to the hydraulic excavator 1. In response to this, the hydraulic excavator 1 conveys the intention of the worker 3 to approach to the operator 2 by using the input-output device 12, and the hydraulic excavator 1 is set in an input waiting state for determining whether the operator 2 has confirmed the intention of the worker 3 to approach. When the operator 2 performs input indicating that the operator 2 has confirmed the intention of the worker 3 to approach by operating the input-output device 12, the hydraulic excavator 1 further transmits the information to the worker terminal 4, and the worker terminal 4 notifies the worker 3 by using vibration, display, or the like that the intention of the worker 3 to approach is recognized by the operator 2. This series of procedures will be referred to as communication processing.

The construction assisting system according to the present embodiment basically performs safety operation when the worker 3 intrudes into the movable region A1 of the hydraulic excavator 1. The safety operation includes, for example, the hydraulic excavator 1 decelerating or stopping operation, the hydraulic excavator 1 warning the worker by sound or light, the worker terminal 4 warning the worker by sound or vibration, and the like. The safety operation may be one of these, or a plurality thereof may be combined with each other. In the present embodiment, the safety operation is the stopping of the operation of the hydraulic excavator 1 and the warning of the worker 3 by the vibration of the worker terminal 4. However, the safety operation is not performed for the worker 3 in a state in which the communication processing is performed, and the operator 2 and the worker 3 have confirmed the mutual intentions. Thus, although when either one is not aware of the counterpart (when the operator 2 is not aware of the approaching of the worker 3 or when the worker 3 is not aware of the approaching of the hydraulic excavator 1), a risk between the hydraulic excavator 1 and the worker 3 is reduced by performing the safety operation of stopping the operation of the hydraulic excavator 1 or the like, the state in which the mutual intentions are confirmed (state in which communication is established) is a state in which the risk between the hydraulic excavator 1 and the worker 3 is recognized, so that action can be performed carefully, and the risk is reduced even when the safety operation is not performed. Therefore, even when the worker 3 approaches the hydraulic excavator 1, the operation of the hydraulic excavator 1 is not stopped, and peripheral work can be performed in a state of a low risk.

FIGS. 4A to 4D are diagrams showing states of operation of the worker terminal. In addition, FIG. 5 is a diagram showing a state of operation of the input-output device.

As shown in FIGS. 4A to 4D, the worker terminal 4 has a touch panel monitor 41.

Figure 4A:
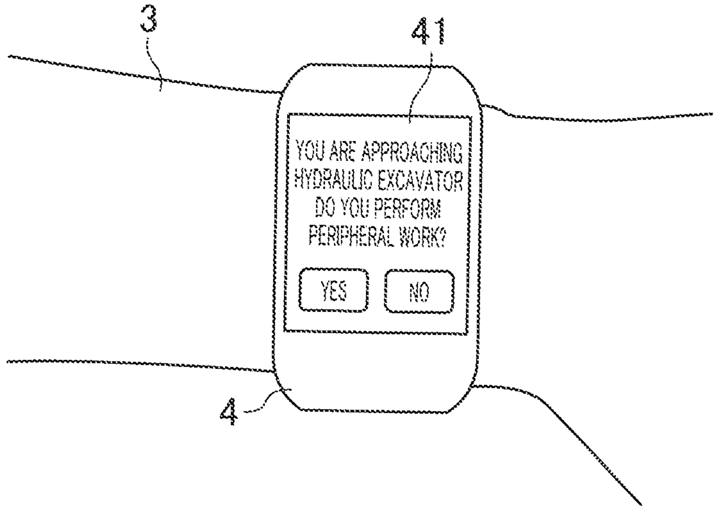
FIG. 4A is a diagram showing a state of operation of a worker terminal.
Figure 5:
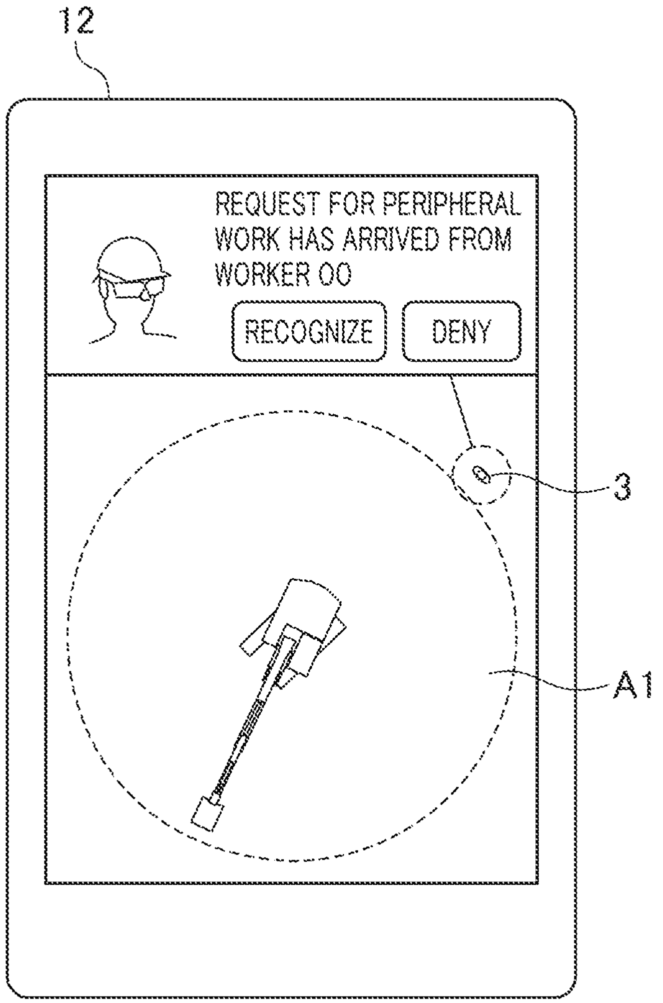
FIG. 5 is a diagram showing a state of operation of an input-output device.

When the approach intention detecting device 52 determines that a position obtained by the worker position information obtaining device 50 is within the notification region A2, the approach intention detecting device 52 makes display inquiring whether to perform peripheral work on the touch panel monitor 41 (see FIG. 4A). Two buttons (for example, a "yes" button and a "no" button) respectively selected when there is an intention of performing the peripheral work and when there is no intention of performing the peripheral work are arranged on an inquiry screen in order to make the worker 3 indicate whether or not the worker 3 has the intention of performing the peripheral work. The worker 3 is prompted to press either button. The approach intention detecting device 52 detects the approach intention of the worker 3 when the worker 3 presses the button for the presence of the approach intention.

Figure 4B:
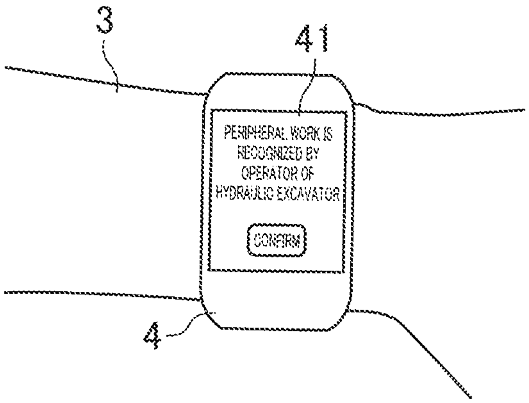
FIG. 4B is a diagram showing a state of operation of the worker terminal.
Figure 4C:
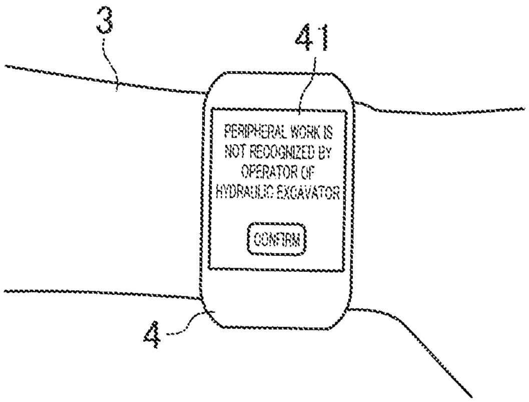
FIG. 4C is a diagram showing a state of operation of the worker terminal.
Figure 4D:
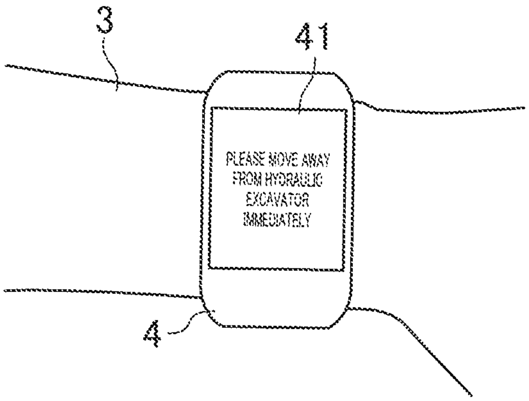
FIG. 4D is a diagram showing a state of operation of the worker terminal.

When the operator 2 of the hydraulic excavator 1 makes approach confirmation, the approach confirmation presenting device 53 displays a screen indicating whether the approach is recognized by the operator 2 (see FIG. 4B and FIG. 4C).

In addition, in the present embodiment, the safety operation executing device 57 is configured to be implemented within the controller 11. However, when the safety operation executing device 57 is implemented also within the worker terminal 4, for example, and the worker 3 intrudes into the movable region A1 in the approach prohibiting state, display prompting the worker 3 to go out of the movable region or a warning by vibration can be provided as the safety operation (see FIG. 4D).

As shown in FIG. 5, the approach intention presenting device 58 presents the identification information and the approach intention of the worker 3 to the operator 2 on the screen of the input-output device 12, and two buttons are arranged within the screen, the two buttons being a button for recognizing the approach of the worker 3 (for example, a "recognize" button) and a button for denying the approach (for example, a "deny" button). The approach confirmation obtaining device 59 obtains the approach confirmation information of the operator 2 when either button is pressed. In addition, as shown in FIG. 5, positional relation between the worker 3 sending the approach intention and the hydraulic excavator 1 and positional relation between the movable region A1 of the hydraulic excavator 1 and the worker 3 are displayed, so that the recognition of the worker 3 by the operator 2 is performed accurately.

Operation of the construction assisting system according to the present embodiment configured as described above will be described in more detail.

Figure 6:
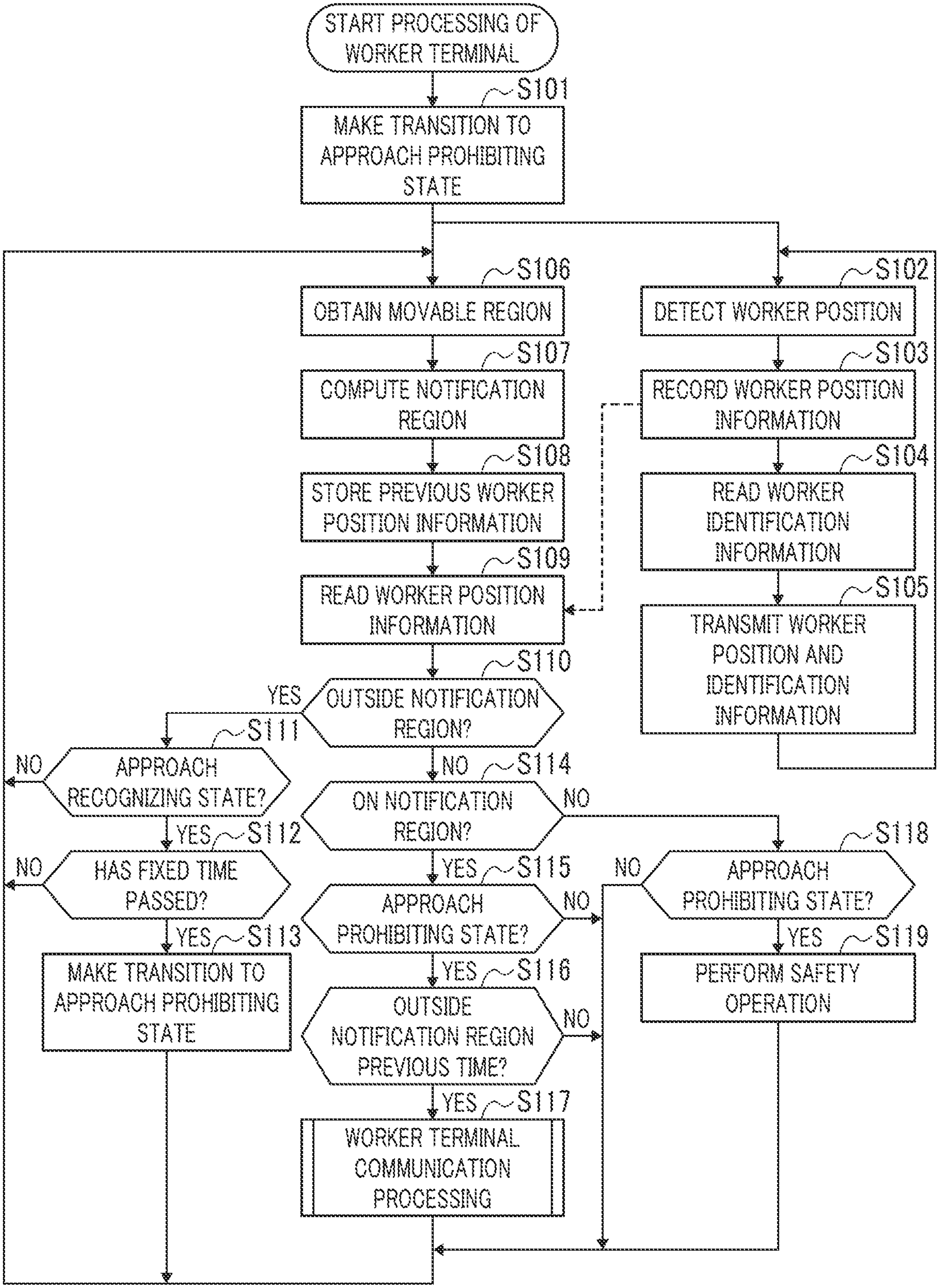
FIG. 6 is a flowchart showing processing contents of the worker terminal.
Figure 7:
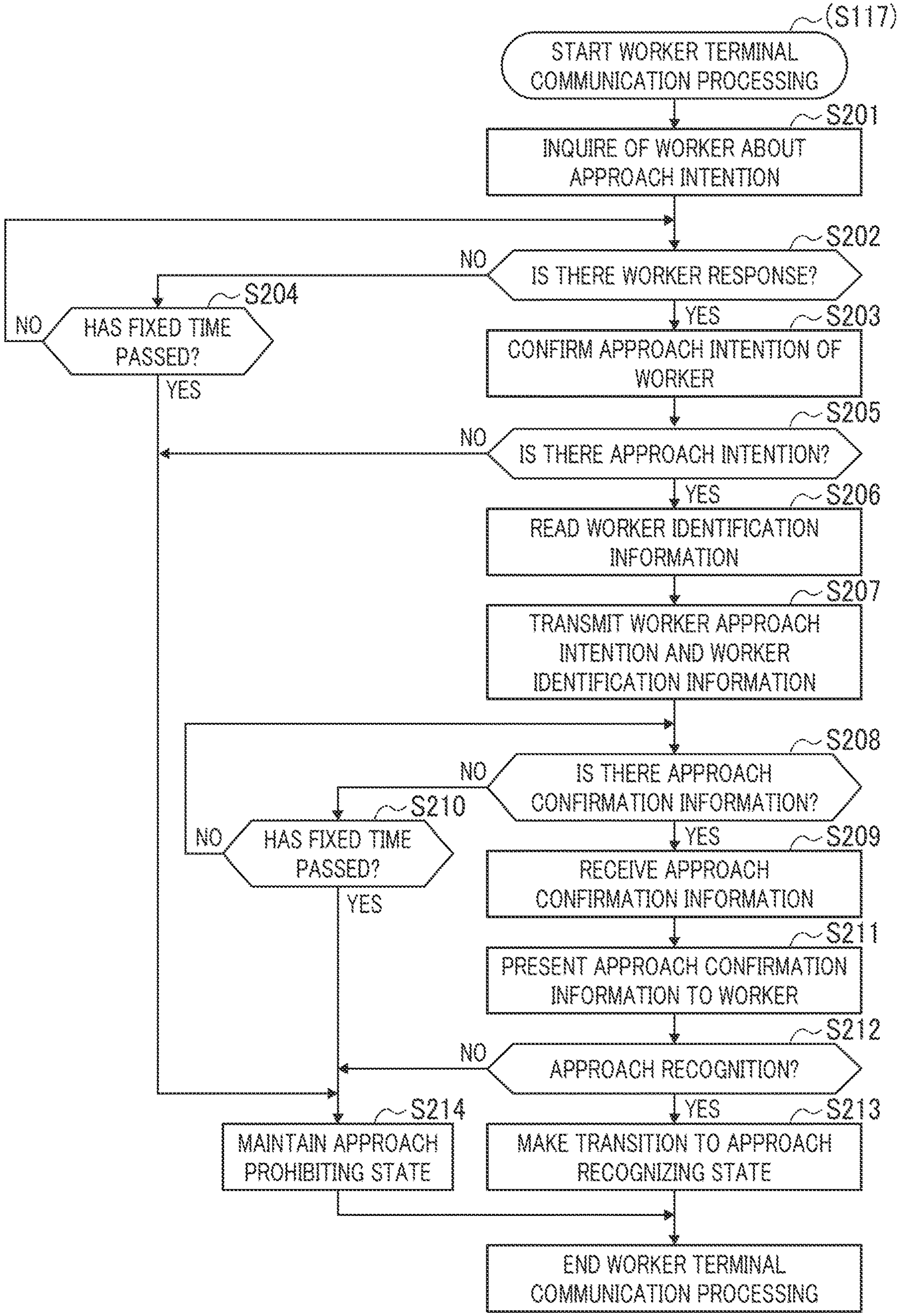
FIG. 7 is a flowchart showing processing contents of communication processing in the flowchart of FIG. 6.
Figure 8:
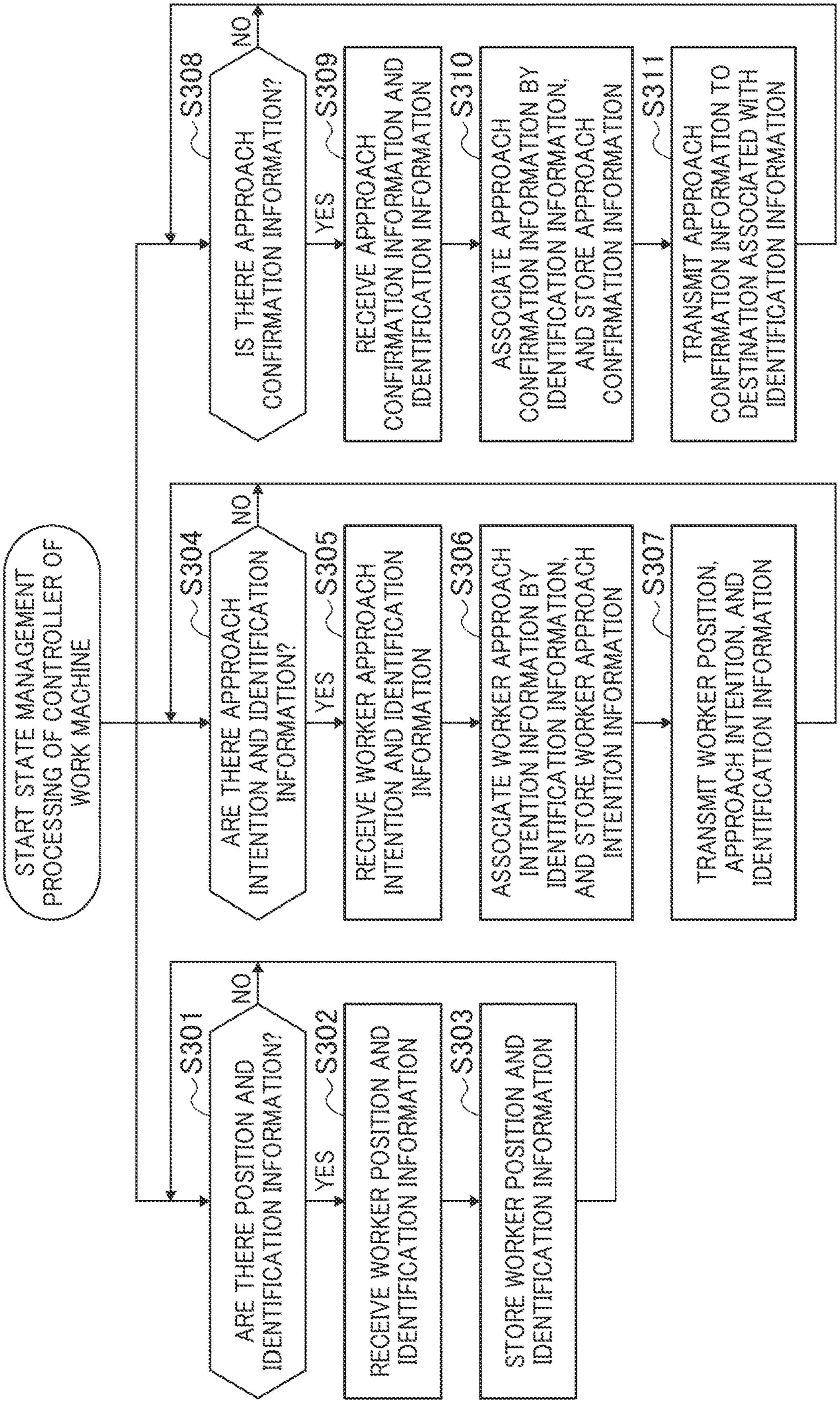
FIG. 8 is a flowchart showing processing contents of a state managing device of a controller.
Figure 9:
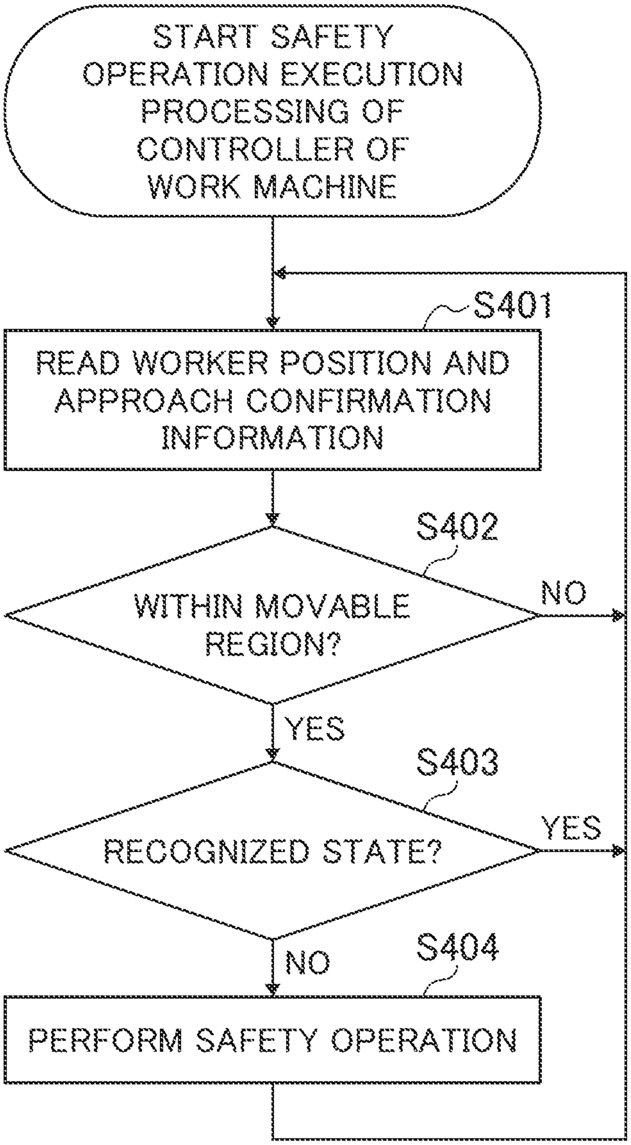
FIG. 9 is a flowchart showing processing contents of a safety operation executing device of the controller.
Figure 10:
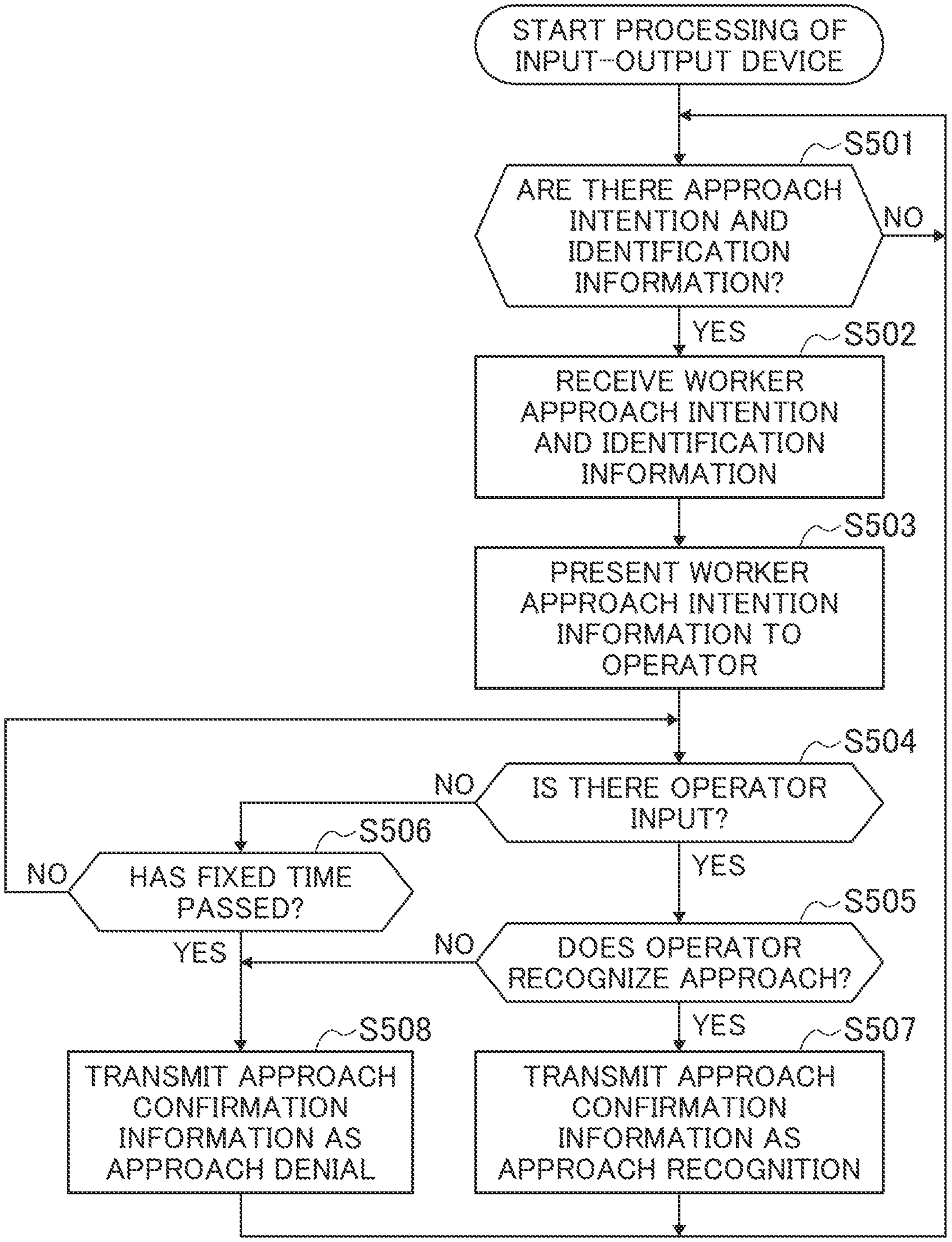
FIG. 10 is a flowchart showing processing contents of the input-output device.

FIGS. 6 to 10 are flowcharts showing processing contents of the construction assisting system. FIG. 6 is a flowchart showing processing contents of the worker terminal. FIG. 7 is a flowchart showing processing contents of the communication processing in the flowchart of FIG. 6. FIG. 8 is a flowchart showing processing contents of the state managing device of the controller. FIG. 9 is a flowchart showing processing contents of the safety operation executing device of the controller. FIG. 10 is a flowchart showing processing contents of the input-output device.

The processing contents of the worker terminal 4 will first be described.

In FIG. 6, the worker terminal 4 first sets a confirmation state from the operator, which is retained by the worker terminal 4, to the approach prohibiting state (step S101). Thereafter, the processing of steps S102 to S105 and the processing of steps S106 to S119 are performed in parallel with each other.

The processing of steps S102 to S105 is related to the obtainment and transmission of the worker position information. First, the worker terminal 4 detects the worker position information by the GPS included in the worker terminal 4 (step S102), records the information in a memory within the worker terminal 4 (step S103), reads the worker identification information stored in the memory within the worker terminal 4 (step S104), and transmits a set of the worker position information obtained in step S102 and the worker identification information obtained in step S104 to the hydraulic excavator 1 by the communicating device 54 (step S105). The processing of steps S102 to S105 is thereafter repeated.

The processing of steps S106 to S119 is related to the processing contents of the approach intention detecting device 52 and the approach confirmation presenting device 53. First, the approach intention detecting device 52 obtains the movable region A1 of the hydraulic excavator 1 (step S106), and computes the notification region A2 separated from the movable region A1 to the outside by a predetermined distance (step S107). Next, the worker terminal 4 stores previous worker position information (step S108), and reads the latest worker position information recorded in step S103 (step S109).

Next, the worker terminal 4 determines whether or not the position of the worker 3, which is indicated by the worker position information, is outside the notification region A2 computed in step S107 (that is, whether or not the position of the worker 3 is on the notification outside region A3) (step S110). When a result of the determination is YES, that is, when the position of the worker 3 is outside the notification region A2 (on the notification outside region A3), the worker terminal 4 determines whether the confirmation state from the operator 2, which is retained by the worker terminal 4, is the approach recognizing state or the approach prohibiting state (step S111). When a result of the determination is NO, that is, when the confirmation state is the approach prohibiting state, the worker terminal 4 returns to the processing of step S106.

In addition, when the result of the determination in step S111 is YES, that is, when the confirmation state is the approach recognizing state, the worker terminal 4 determines whether or not a time for which the confirmation state is the approach recognizing state while the position of the worker 3 is outside the notification region A2 (on the notification outside region A3) has elapsed for a time determined in advance (step S112). When a result of the determination is NO, the worker terminal 4 returns to the processing of step S106. When the result of the determination is YES, the worker terminal 4 makes a transition to the approach prohibiting state (step S113), and then returns to the processing of step S106.

Thus, in the processing of steps S111 to S113, the approach recognizing state is maintained for not more than a fixed time when the worker 3 goes outside the notification region after the communication processing is once performed within the notification region A2 and the approach recognizing state is set, and a need for performing the communication processing again is obviated even when the worker 3 intrudes into the notification region A2 or the movable region A1 again. This prevents a decrease in work efficiency due to frequent execution of the communication processing. However, when a predetermined time has passed since an exit from the notification region A2, the communication processing needs to be performed again from a viewpoint of safety. The time for which the approach recognizing state is maintained is preferably set to be an appropriate time from the skills and work contents of the worker and the operator on the site or the like. However, it is considered that when the time for which the approach recognizing state is maintained is about a few seconds, for example, there is a strong possibility that the awareness of the worker and the operator is still maintained, and there is a small risk.

In addition, when the result of the determination in step S110 is NO, that is, when the position of the worker 3 is not on the notification outside region A3, the worker terminal 4 determines whether or not the position of the worker 3 is on the notification region A2 (step S114). When a result of the determination is YES, the worker terminal 4 determines whether or not the approach allowing state is set and whether or not the previous worker position information obtained in step S108 is outside the notification region A2 (on the notification outside region A3) (steps S115 and S116).

When determination results in both of steps S115 and S116 are YES, the worker terminal 4 performs the communication processing of the worker terminal (step S117). The worker terminal 4 then returns to the processing of step S106. In addition, when at least one of the determination results in steps S115 and S116 is NO, the worker terminal 4 returns to the processing of step S106.

In addition, when the result of the determination in step S114 is NO, that is, when the position of the worker 3 is on the movable region A1, the worker terminal 4 determines whether or not the present confirmation state is the approach prohibiting state (step S118). When a result of the determination is NO, that is, when the approach recognizing state is set, the worker terminal 4 returns to the processing of step S106. In addition, when the result of the determination in step S118 is YES, the worker terminal 4 performs the safety operation (step S119). The worker terminal 4 then returns to the processing of step S106.

The safety operation prompts the worker 3 to evacuate from the movable region A1 to the outside (to the notification region A2 side or the notification outside region A3 side) immediately by, for example, sound, vibration, display on the worker terminal 4 (see FIGS. 4A to 4D), or the like. As is also shown in the flowchart of FIG. 6, this safety operation is performed when the worker 3 intrudes into the movable region A1 while the confirmation state from the operator 2 is the approach prohibiting state, that is, in a state in which the worker 3 and the operator 2 do not communicate with each other. The safety operation further reduces the risk of an accident and contributes to safety in conjunction with the safety operation on the hydraulic excavator 1 side.

In FIG. 7, the worker terminal 4 first inquires of the worker 3 about an approach intention as the communication processing (step S117 in FIG. 6) (step S201). The inquiry to the worker 3 about the approach intention is made by displaying information for approach position detection on the worker terminal 4 (see FIG. 4A and the like).

Next, the worker terminal 4 determines whether or not there is a response from the worker 3 by button operation (step S202). When a result of the determination is NO, that is, when there is no response from the worker 3, the worker terminal 4 determines whether or not a fixed time determined in advance has passed since the inquiry to the worker 3 (step S204). When a result of the determination in step S204 is NO, the worker terminal 4 returns to the processing of step S202. In addition, when the result of the determination in step S204 is YES, the worker terminal 4 maintains the approach prohibiting state (step S214), and then ends the processing. This is processing for handling no response from the worker 3 to the inquiry about the approach intention for the fixed time as no intention to approach.

In addition, when the result of the determination in step S202 is YES, that is, when there is a response from the worker 3, the worker terminal 4 confirms the contents of the response (step S203). Next, the worker terminal 4 determines whether or not the contents of the response are a response with an approach intention (step S205). When a result of the determination in step S205 is NO, the worker terminal 4 maintains the approach prohibiting state (step S214), and then ends the processing.

When the result of the determination in step S205 is YES, that is, when the worker 3 has the intention to approach, the worker terminal 4 reads the worker identification information recorded in the memory of the worker terminal 4 (step S206), and transmits a set of the worker approach intention and the worker identification information to the hydraulic excavator 1 (step S207).

Thereafter, the worker terminal 4 determines whether or not confirmation information from the operator 2 has arrived at the worker terminal 4 (step S208). When a result of the determination is NO, the worker terminal 4 determines whether or not an elapsed time since the transmission of the worker intention information has elapsed for a time determined in advance (step S210). When a result of the determination in step S210 is NO, the worker terminal 4 returns to the processing of step S208. In addition, when the result of the determination in step S210 is YES, the worker terminal 4 maintains the approach prohibiting state (step S214), and then ends the processing. This is to determine that no recognition is made from the operator 2 and set the approach prohibiting state when the confirmation information from the operator 2 is not obtained even after the passage of the predetermined time (including a communication error).

In addition, when the result of the determination in step S208 is YES, that is, when a confirmation state from the operator 2 has arrived, the worker terminal 4 receives the approach confirmation information (step S209), and presents the approach confirmation information to the worker 3 by transmitting the approach confirmation information to the worker terminal 4 (step S211). The presentation of the approach confirmation information to the worker 3 is performed by presentation of the approach confirmation information to the worker terminal 4 (see FIG. 4B, FIG. 4C, and the like).

Next, the worker terminal 4 determines whether or not the confirmation state is approach recognition (step S212). When a result of the determination is NO, that is, when the confirmation state is approach denial, the worker terminal 4 maintains the approach prohibiting state (step S214), and then ends the processing. In addition, when the result of the determination in step S212 is YES, the worker terminal 4 shifts the confirmation state retained by the worker terminal 4 to the approach recognizing state (step S213), and then ends the processing.

Description will next be made of processing contents of the state managing device 56 of the controller 11.

In FIG. 8, the state managing device 56 performs the processing of steps S301 to S303, the processing of steps S304 to S307, and the processing of steps S308 to S311 in parallel with each other. These pieces of processing are started at a time that the hydraulic excavator 1 is started (for example, at a time that an engine is started).

The processing of steps S301 to S303 receives the worker position information and the worker identification information from the worker terminal 4, and stores the worker position information and the worker identification information in the memory within the controller 11. The state managing device 56 first determines whether or not the worker position information and the worker identification information from the worker terminal 4 are transmitted to the state managing device 56 (step S301). When a result of the determination is YES, the state managing device 56 receives the worker position information and the worker identification information transmitted from the worker terminal 4 (step S302), stores the worker position information and the worker identification information as a set in the memory within the controller 11 (step S303), and then returns to the processing of step S301. In addition, when the result of the determination in step S301 is NO, that is, when there is no information, the state managing device 56 repeats the processing of step S301. Thus, in the processing of steps S301 to S303, the state managing device 56 repeats the processing of receiving the information transmitted from the worker terminal 4 and writing the latest information to the memory.

The processing of steps S304 to S307 receives the worker intention information and the worker identification information, and transmits the worker intention information and the worker identification information to the input-output device 12. The state managing device 56 first determines whether or not there are worker approach intention information and worker identification information transmitted from the worker terminal 4 (step S304). When a result of the determination is YES, the state managing device 56 receives the worker approach intention information and the worker identification information (step S305), associates the worker position information and the worker approach intention information with each other on the basis of the worker identification information and stores the worker intention information in the memory within the controller 11 (step S306), transmits the worker position information, the worker approach intention information, and the worker identification information associated with each other to the input-output device 12 (step S307), and then returns to the processing of step S304. In addition, when the result of the determination in step S304 is NO, that is, when there is no information, the state managing device 56 repeats the processing of step S304.

The processing of steps S308 to S311 transmits the approach confirmation information of the operator 2, which is obtained from the input-output device 12, to the worker terminal 4. The state managing device 56 first determines whether or not the approach confirmation information and the worker identification information have arrived from the input-output device 12 (step S308). When a result of the determination is YES, the state managing device 56 receives the approach confirmation information and the worker identification information (step S309), stores the approach confirmation information in the memory within the controller 11 of the hydraulic excavator 1 in association with the worker identification information (step S310), transmits the approach confirmation information to the appropriate worker terminal 4 (step S311), and then returns to the processing of step S308. Incidentally, the appropriate worker terminal 4 means that when there are a plurality of workers 3, the worker terminal 4 from which the worker identification information is transmitted is stored in advance, and the worker terminal 4 corresponding to the worker identification information associated with the approach confirmation information is selected. Incidentally, the controller 11 of the hydraulic excavator 1 may be provided with a list in which the worker terminal 4 and the worker identification information are associated with each other in advance or the like. In addition, when the result of the determination in step S308 is NO, that is, when the approach confirmation information has not arrived, the state managing device 56 repeats the processing of step S308.

Description will next be made of processing contents of the safety operation executing device 57 of the controller 11.

In FIG. 9, the safety operation executing device 57 first reads the worker position information and the approach confirmation information associated with each other by the worker identification information from the state managing device 56 (step S401). At this time, when a plurality of pieces of worker information are stored in the state managing device 56, the safety operation executing device 57 reads all of the plurality of pieces of worker information.

Next, the safety operation executing device 57 determines whether or not the worker position information is within the movable region A1 (step S402). When a result of the determination is NO, that is, when all of the pieces of worker position information read in step S401 are outside the movable region A1, the safety operation executing device 57 returns to the processing of step S401.

In addition, when the result of the determination in step S402 is YES, that is, when at least one of the pieces of worker position information read in step S401 is within the movable region A1, the safety operation executing device 57 determines whether or not all of the approach confirmation information associated with the identification information of workers 3 whose worker positions are within the movable region A1 represents a recognized state (step S403). When a result of the determination is YES, that is, when all of the workers 3 within the movable region A1 are in a recognized state, the safety operation executing device 57 determines that there is a low risk because all of the workers 3 within the movable region A1 desire to work within the movable region A1, and the operator 2 of the hydraulic excavator 1 recognizes the desire. The safety operation executing device 57 then returns to the processing of step S401.

In addition, when the result of the determination in step S403 is YES, that is, when at least one piece of the approach confirmation information associated with the identification information of the workers 3 whose worker positions are within the movable region A1 does not represent the recognized state (that is, in the approach prohibiting state), the safety operation executing device 57 performs the safety operation (step S404). The safety operation executing device 57 then returns to the processing of step S401. Incidentally, the safety operation is, for example, to decelerate or stop the operation of actuators of the hydraulic excavator 1 or issue a warning to the operator and the peripheral workers by sound or light.

Processing contents of the input-output device 12 will next be described.

In FIG. 10, the input-output device 12 first determines whether or not there is worker approach intention information and worker identification information transmitted from the state managing device 56 (step S501). When a result of the determination is NO, the input-output device 12 repeats the processing of step S501.

In addition, when the result of the determination in step S501 is YES, that is, when there are worker approach intention information and worker identification information, the input-output device 12 receives the information (step S502), and presents the presence of the worker approach intention to the operator on the basis of the received information (step S503). The presentation of the worker approach intention is performed by displaying buttons inquiring of the operator 2 whether the operator 2 recognizes the worker approach intention or whether the operator 2 denies the approach of the worker for a reason of desiring to focus on work or the like on an output unit (monitor or the like) of the input-output device 12 together with the worker approach intention, and prompting the operator for a response (see FIG. 5 and the like).

Next, the input-output device 12 determines whether or not a button displayed on the input-output device 12 is pressed (step S504). When a result of the determination is NO, that is, when there is no input from the operator 2, the input-output device 12 determines whether or not a fixed time determined in advance has elapsed since the display of the buttons on the input-output device 12 (step S506).

When a result of the determination in step S506 is NO, that is, when the fixed time has not elapsed since the display of the buttons, the input-output device 12 returns to the processing of step S504. In addition, when the result of the determination in step S506 is YES, that is, when the fixed time has elapsed since the display of the buttons, the input-output device 12 transmits approach confirmation information as approach denial (step S508). The input-output device 12 then returns to the processing of step S501. When the operator does not indicate an intention for the fixed time as in steps S506 and S508, the approach of the worker is prohibited by making a determination on a safe side.

In addition, when the result of the determination in step S504 is YES, that is, when there is a response from the operator 2 (an operation of the input-output device 12 is performed by the operator 2), the input-output device 12 determines whether or not a response result of the operator 2 is a recognition of the approach intention of the worker (step S505). When a result of the determination is NO, that is, when the operator 2 selects approach denial, the input-output device 12 proceeds to the processing of step S508. In addition, when the result of the determination in step S505 is YES, that is, when the operator 2 recognizes the approach intention of the worker 3, the input-output device 12 transmits approach confirmation information as approach recognition to the state managing device 56 (step S507), and then returns to the processing of step S501.

In the present embodiment configured as described above, the worker 3 performing work on the periphery of the hydraulic excavator 1 and the operator 2 of the hydraulic excavator 1 can communicate with each other. When the communication is established, peripheral work is allowed from a viewpoint of productivity. When the communication is not established, the safety operation can be performed to set a state in which it is difficult to perform the peripheral work from a viewpoint of safety. It is therefore possible to perform construction assistance according to the intention of the worker, and further improve safety of the worker while suppressing a decrease in work efficiency.

Second Embodiment

A second embodiment of the present invention will be described with reference to FIG. 11.

The present embodiment represents a case where each function of the worker terminal 4 in the first embodiment is provided to the hydraulic excavator 1.

Figure 11:
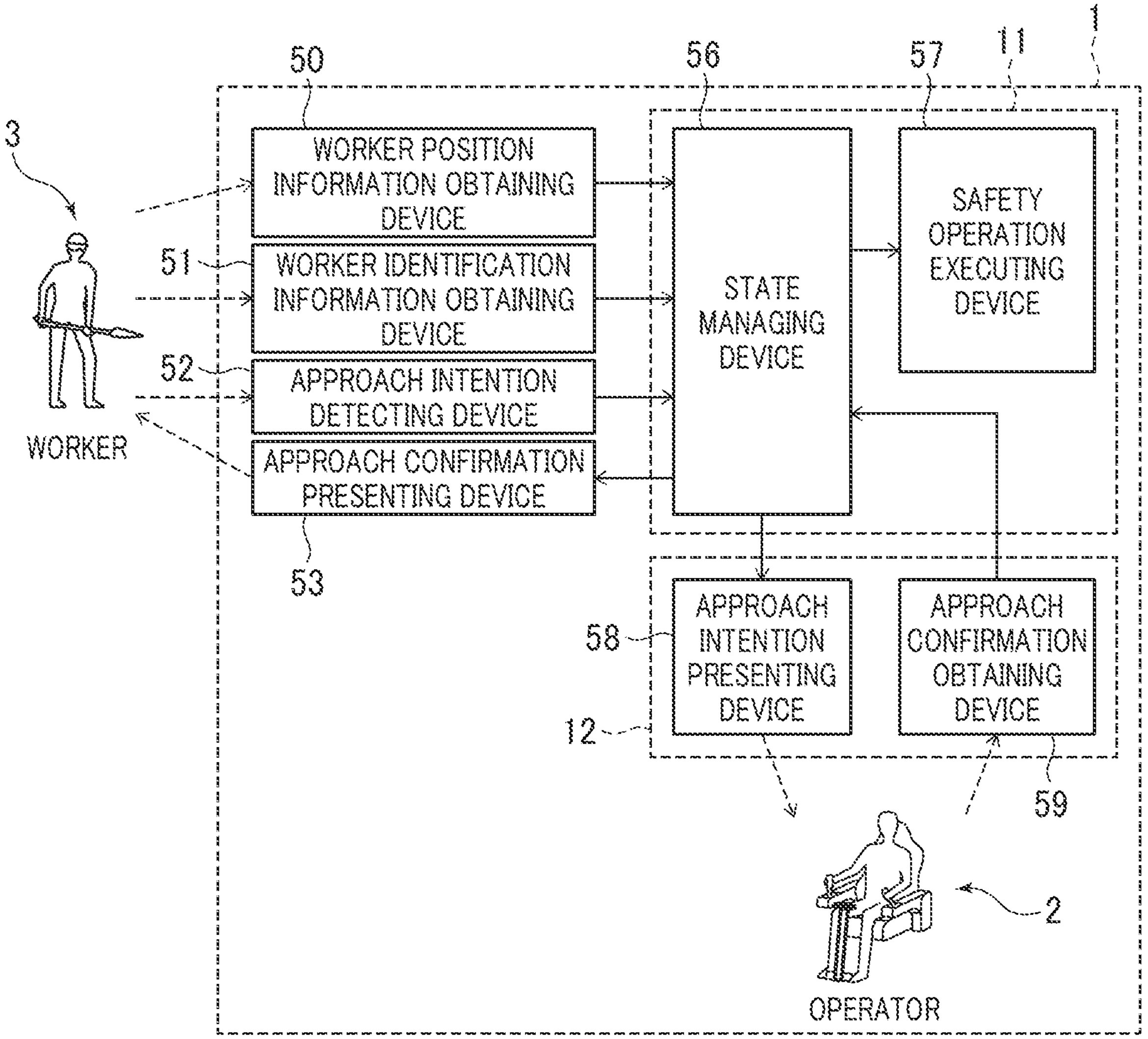
FIG. 11 is a functional block diagram schematically showing a general configuration of a construction assisting system according to a second embodiment.

FIG. 11 is a functional block diagram schematically showing a general configuration of a construction assisting system according to the present embodiment. In the figure, processing similar to that of the first embodiment is identified by the same reference numerals, and description thereof will be omitted.

In FIG. 11, the construction assisting system includes the worker position information obtaining device 50, the worker identification information obtaining device 51, the approach intention detecting device 52, the approach confirmation presenting device 53, the state managing device 56, the safety operation executing device 57, the approach intention presenting device 58, and the approach confirmation obtaining device 59 provided to the hydraulic excavator 1. The state managing device 56 and the safety operation executing device 57 are implemented by the controller 11 mounted in the hydraulic excavator 1.

The worker position information obtaining device 50 is a camera, a laser sensor, or the like mounted on the hydraulic excavator 1, and is an executing device that can obtain a relative position of the worker 3 with respect to the hydraulic excavator 1.

The worker identification information obtaining device 51 is a camera mounted on the hydraulic excavator 1 or the like, and is implemented by reading and identifying information of the face of the worker 3, a marker, or the like. Incidentally, when a marker is used, the worker identification information obtaining device 51 can be implemented by, for example, providing a helmet or clothes worn by the worker 3 with the marker different for each worker in advance.

The approach intention detecting device 52 implements detection of the approach intention of the worker 3 by, for example, obtaining a gesture such as a movement of waving an arm of the worker 3 by a sensor such as a camera mounted on the hydraulic excavator 1. A gesture easy to understand is set as an approach intention in advance, and the approach intention of the worker 3 can be detected by recognizing whether or not the worker has made such a gesture.

The approach confirmation presenting device 53 is implemented by mounting a monitor or a speaker for the peripheral worker on the hydraulic excavator 1. Whether the operator 2 has made approach recognition or approach denial can be conveyed to the worker 3 by light or sound.

Other configurations are similar to those of the first embodiment.

The present embodiment configured as described above can also provide effects similar to those of the first embodiment.

Features of each of the foregoing embodiments will next be described.

(1) In the foregoing embodiment, the construction assisting system including the controller 11 that performs construction assistance processing of assisting in construction performed by the work machine (for example, the hydraulic excavator 1) on the basis of positional relation between the worker 3 and the work machine includes: the worker position information obtaining device 50 that obtains position information of the worker; the approach intention detecting device 52 that detects an intention of the worker to approach the work machine; the approach intention presenting device 58 that presents a detection result of the approach intention detecting device to the operator 2 of the work machine; and the approach confirmation obtaining device 59 that obtains a confirmation state of the operator of the work machine for contents presented by the approach intention presenting device, the controller performing the construction assistance processing on the basis of the position information obtained by the worker position obtaining device when the confirmation state obtained by the approach confirmation obtaining device is a state in which the operator of the work machine denies an approach of the worker or when the operator of the work machine does not confirm the intention of the worker to approach.

It is thereby possible to perform construction assistance according to the intention of the worker, and further improve safety of the worker while suppressing a decrease in work efficiency.

(2) In addition, in the foregoing embodiment, the construction assisting system of (1) further includes the worker terminal 4 carried by the worker 3, and the worker terminal includes a terminal (for example, the worker terminal 4) including the worker position information obtaining device 50 and the approach intention detecting device 52.

(3) In addition, in the foregoing embodiment, in the construction assisting system of (1) or (2), the construction assistance processing decreases operation speed of the work machine (for example, the hydraulic excavator 1) or stops the work machine.

(4) In addition, in the foregoing embodiment, in the construction assisting system of (1) or (2), the construction assistance processing gives a warning that the worker 3 is approaching the work machine (for example, the hydraulic excavator 1) to the worker 3 by sound, light, or vibration.

(5) In the foregoing embodiment, the work machine (for example, the hydraulic excavator 1) including the controller 11 that performs construction assistance processing of assisting in construction performed by the work machine on the basis of positional relation between the worker 3 and the work machine includes: the worker position information obtaining device 50 that obtains position information of the worker; the approach intention detecting device 52 that detects an intention of the worker to approach the work machine; the approach intention presenting device 58 that presents a detection result of the approach intention detecting device to the operator 2 of the work machine; the approach confirmation obtaining device 59 that obtains a confirmation state of the operator of the work machine for contents presented by the approach intention presenting device, the controller performing the construction assistance processing on the basis of the position information obtained by the worker position obtaining device when the confirmation state obtained by the approach confirmation obtaining device is a state in which the operator of the work machine denies an approach of the worker or when the operator of the work machine does not confirm the intention of the worker to approach.

(6) In addition, in the foregoing embodiment, in the work machine (for example, the hydraulic excavator 1) of (5), the construction assistance processing decreases operation speed of the work machine or stops the work machine.

(7) In addition, in the foregoing embodiment, in the work machine (for example, the hydraulic excavator 1) of (5), the construction assistance processing gives a warning that the worker 3 is approaching the work machine to the worker 3 by sound or light.

<Supplementary Notes>

It is to be noted that the present invention is not limited to the foregoing embodiments, but includes various modifications and combinations within a scope not departing from the spirit of the present invention. In addition, the present invention is not limited to those including all of the configurations described in the foregoing embodiments, but also includes those from which a part of the configurations are omitted. In addition, a part or the whole of each of the configurations, the functions, and the like described above may be implemented by, for example, being designed in an integrated circuit or the like. In addition, each of the configurations, the functions, and the like described above may be implemented by software such that a processor interprets and executes a program that implements each function.

DESCRIPTION OF REFERENCE CHARACTERS

1: Hydraulic excavator
1A: Work device
1B: Upper swing structure
1C: Lower track structure
2: Operator
3, 3*a* to 3*c*: Worker
4: Worker terminal
11: Controller
12: Input-output device
20: Cab
41: Monitor
50: Worker position information obtaining device
51: Worker identification information obtaining device
52: Approach intention detecting device
53: Approach confirmation presenting device
54, 55: Communicating device
56: State managing device
57: Safety operation executing device
58: Approach intention presenting device
59: Approach confirmation obtaining device
A1: Movable region
A2: Notification region
A3: Notification outside region

The invention claimed is:

1. A construction assisting system including a controller that performs construction assistance processing of assisting in construction performed by a work machine on a basis of positional relation between a worker and the work machine, the construction assisting system comprising:

a worker position information obtaining device that obtains position information of the worker;

an approach intention detecting device that notifies the worker of an inquiry about an intention to approach the work machine when the worker intrudes into a notification region set further outward of a movable region set as a range reachable by a structure of the work machine, and detects the intention of the worker to approach the work machine on a basis of a response to the inquiry from the worker;

an approach intention presenting device that presents a detection result of the approach intention detecting device to an operator of the work machine; and an approach confirmation obtaining device that obtains a confirmation state of the operator of the work machine for contents presented by the approach intention presenting device, the controller performing safety operation as the construction assistance processing when determining that the worker has intruded into the movable region on a basis of the position information obtained by the worker position information obtaining device when the confirmation state obtained by the approach confirmation obtaining device is a state in which the operator of the work machine denies an approach of the worker or when the operator of the work machine does not confirm the intention of the worker to approach.

2. The construction assisting system according to claim 1, further comprising:

a worker terminal carried by the worker, wherein the worker terminal includes the worker position information obtaining device and the approach intention detecting device.

3. The construction assisting system according to claim 1, wherein the safety operation of the construction assistance processing decreases operation speed of the work machine or stops the work machine.

4. The construction assisting system according to claim 1, wherein the safety operation of the construction assistance processing gives a warning that the worker is approaching the work machine to the worker by sound, light, or vibration.

5. The construction assisting system according to claim 1, wherein the controller does not perform the safety operation as the construction assistance processing when the confirmation state obtained by the approach confirmation obtaining device is a state in which the operator of the work machine recognizes the intention of the worker to approach.

6. A work machine including a controller that performs construction assistance processing of assisting in construction performed by a work machine on a basis of positional relation between a worker and the work machine, the work machine comprising:

a worker position information obtaining device that obtains position information of the worker;

an approach intention detecting device that notifies the worker of an inquiry about an intention to approach the work machine when the worker intrudes into a notification region set further outward of a movable region set as a range reachable by a structure of the work machine, and detects the intention of the worker to approach the work machine on a basis of a response to the inquiry from the worker;

an approach intention presenting device that presents a detection result of the approach intention detecting device to an operator of the work machine; and an approach confirmation obtaining device that obtains a confirmation state of the operator of the work machine for contents presented by the approach intention presenting device, the controller performing safety operation as the construction assistance processing when determining that the worker has intruded into the movable region on a basis of the position information obtained by the worker position information obtaining device when the confirmation state obtained by the approach confirmation obtaining device is a state in which the operator of the work machine denies an approach of the worker or when the operator of the work machine does not confirm the intention of the worker to approach.

7. The work machine according to claim 6, wherein the safety operation of the construction assistance processing decreases operation speed of the work machine or stops the work machine.

8. The work machine according to claim 6, wherein the safety operation of the construction assistance processing gives a warning that the worker is approaching the work machine to the worker by sound or light.

9. The construction assisting system according to claim 6, wherein the controller does not perform the safety operation as the construction assistance processing when the confirmation state obtained by the approach confirmation obtaining device is a state in which the operator of the work machine recognizes the intention of the worker to approach.

* * * * *